US011087777B1

(12) United States Patent
Valerio Parise et al.

(10) Patent No.: US 11,087,777 B1
(45) Date of Patent: Aug. 10, 2021

(54) AUDIO VISUAL CORRESPONDENCE BASED SIGNAL AUGMENTATION

(71) Applicant: Facebook Technologies, LLC, Menlo Park, CA (US)

(72) Inventors: Cesare Valerio Parise, Seattle, WA (US); William Owen Brimijoin, II, Kirkland, WA (US); Philip Robinson, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/853,449

(22) Filed: Apr. 20, 2020

Related U.S. Application Data

(60) Provisional application No. 62/975,096, filed on Feb. 11, 2020.

(51) Int. Cl.
| | | |
|---|---|---|
| *G10L 21/0316* | (2013.01) | |
| *G10L 21/0272* | (2013.01) | |
| *G06F 3/16* | (2006.01) | |
| *H04R 5/04* | (2006.01) | |
| *G02B 27/00* | (2006.01) | |
| *H04R 3/00* | (2006.01) | |
| *G10L 25/87* | (2013.01) | |

(52) U.S. Cl.
CPC ...... *G10L 21/0316* (2013.01); *G02B 27/0093* (2013.01); *G06F 3/167* (2013.01); *G10L 21/0272* (2013.01); *G10L 25/87* (2013.01); *H04R 3/002* (2013.01); *H04R 5/04* (2013.01)

(58) Field of Classification Search
CPC .......... G06F 3/167; G06F 3/165; G06F 3/012; G06F 3/001; G06F 3/013; G06F 3/017; G02B 27/0093; G02B 27/017; G02B 27/0172; G02B 2027/0138; G02B 2027/014; H04R 3/002; H04R 5/04; H04R 25/40; G10L 25/87; G10L 21/0272; G10L 21/0316; H04S 7/302
See application file for complete search history.

(56) References Cited

U.S. PATENT DOCUMENTS

| | | | |
|---|---|---|---|
| 2003/0103647 A1 | 6/2003 | Rui et al. | |
| 2006/0075422 A1 | 4/2006 | Choi et al. | |
| 2013/0083173 A1* | 4/2013 | Geisner ................. | G09G 3/003 348/51 |
| 2017/0153866 A1* | 6/2017 | Grinberg .............. | G02B 27/017 |
| 2017/0230760 A1* | 8/2017 | Sanger ................. | H04R 25/505 |
| 2017/0366896 A1 | 12/2017 | Adsumilli et al. | |
| 2020/0412772 A1 | 12/2020 | Nesta et al. | |

OTHER PUBLICATIONS

United States Office Action, U.S. Appl. No. 16/735,325, dated Jan. 27, 2021, 11 pages.

* cited by examiner

*Primary Examiner* — Yogeshkumar Patel
(74) *Attorney, Agent, or Firm* — Fenwick & West LLP

(57) ABSTRACT

A system includes a headset to capture sound and a visual signal of a local area including one or more sound sources. The system determines a strength of the audio signal and a portion of the visual signal associated with the audio signal, compares the strengths, selects the weaker signal, and augments the weaker signal. The headset accordingly presents augmented audio-visual content to a user, thereby enhancing the user's perception of the weak signal.

20 Claims, 8 Drawing Sheets

US 11,087,777 B1

AUDIO VISUAL CORRESPONDENCE BASED SIGNAL AUGMENTATION

CROSS-REFERENCE TO RELATED APPLICATIONS

This application claims the benefit of U.S. Provisional Application No. 62/975,096, filed Feb. 11, 2020, which is incorporated by reference in its entirety.

FIELD OF THE INVENTION

This disclosure relates generally to artificial reality systems, and more specifically to audio-visual correspondence based signal augmentation.

BACKGROUND

A head mounted display (HMD) may present a user with audio-visual information. However, one or more signals corresponding to the audio and/or visual information may be of poor quality. The user may accordingly experience an uncomfortable headset experience, where a portion of the audio-visual information may be unintelligible.

SUMMARY

A system for audio-visual signal augmentation for use in, e.g., a headset. A user may wear the headset in a local area with a number of sound sources. The system determines a strength of an audio signal associated with a sound source in the local area and a strength of a portion of a visual signal of the local area, the portion corresponding to the audio signal. In response to determining that the audio signal and/or portion of the visual signal are weak, the system augments the weak signal. The user receives the augmented audio and/or visual signal via the headset and as a result, may better perceive the local area.

A method identifies an audio signal of a sound source based in part on a correspondence analysis of a visual signal and sound from a plurality of sources within the local area. The method determines an audio signal strength associated with the audio signal and a visual signal strength associated with a portion of the visual signal corresponding to the audio signal. The method selects a weak signal from a group of signals including the audio signal and the portion of the visual signal based on the strengths of the audio and visual signals. The method augments the weak signal, which is presented to the user in conjunction with other signals from the group of signals.

In some embodiments, a system comprises a transducer assembly, a display assembly, and a controller. The transducer assembly is configured to present audio to the user. The display assembly is configured to present visual content to the user. The controller is configured to identify an audio signal of a sound source based on a correspondence analysis of a visual signal describing a local area that includes a sound source and sound produced by a plurality of sound sources including the sound source within the local area. The controller is also configured to determine an audio signal strength associated with the audio signal and a visual signal strength associated with a portion of the visual signal corresponding to the audio signal. The controller selects a weak signal from the audio signal and the portion of the visual signal based on the audio signal and visual signal strengths. The controller finally augments the weak signal, wherein the weak signal is presented to the user via the transducer assembly and/or the display assembly in conjunction with other signals.

In some embodiments, a non-transitory computer readable medium configured to store program code instructions, when executed by a processor, causes the processor to perform the steps performed by the method described above.

Figure 1:
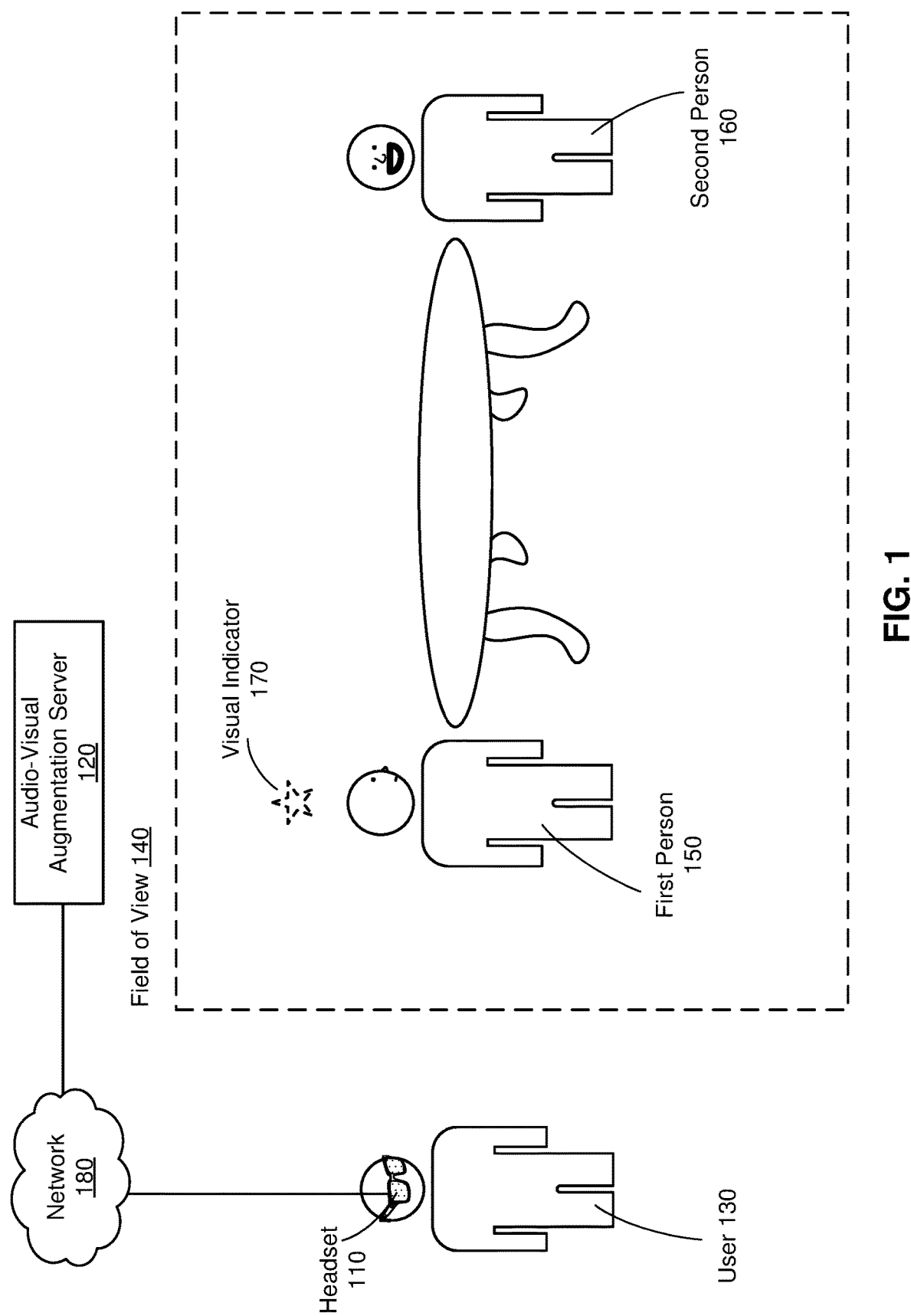
FIG. 1 is a system environment for signal augmentation, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

An artificial reality headset dynamically and/or selectively augments audio and/or visual content. A user of the headset is presented with the augmented audio and/or visual content. The augmented audio and/or visual content improves the intelligibility of one or more audio signals in the area. People often rely on a combination of audio and visual information for comprehension. Accordingly, the system may augment the audio and/or visual content to mirror human cognitive integration of audio and/or visual content. For example, the system may augment the visual signal to show lips for person whose face is hidden from the user; when the lips move as per an audio signal associated with the person, they take advantage of cognitive processing to help the user understand the audio signal with improved clarity.

The system, which may be coupled to the headset, uses audio-visual correspondence to augment audio and/or visual signals presented to the user via the headset. In some embodiments, the audio and/or visual content is from a local area surrounding the user. After performing correspondence analysis on the audio and visual signals corresponding to a sound source in the local area, the system determines strengths of the audio and/or visual signals and augments the weaker signal. For example, a weak audio signal may be amplified; a weak visual signal may be augmented by a visual indicator. The augmented signal is presented to the user, in some embodiments in conjunction with other signals, thereby improving the user's ability to understand the audio-visual content presented to them.

Audio-Visual Signal Augmentation System Environment

FIG. 1 is a system environment for signal augmentation, in accordance with one or more embodiments. The system includes a headset 110 and an audio-visual augmentation server 120. The headset 110 presents a user 130 with a field of view 140 of a surrounding local area. The headset 110 couples to the audio-visual augmentation server 120 via a network 180. In some embodiments, the system includes components other than those described herein. And in some embodiments, the headset 110 may include some or all of the functionality of the audio-visual augmentation server 120.

The headset 110 presents content (e.g., AR and/or MR content) over a field of view 140 to the user 130. The field of view 140 may be of the local area surrounding the user. The local area includes a plurality of sound sources, such as a first person 150 and a second person 160 in FIG. 1. The headset 110 captures audio and/or visual signals from the local area covered by the field of view 140. The audio and/or visual signals correspond to at least one of the sound sources captured in the field of view 140. In the illustrated environment, the headset 110 provides the audio and/or visual signals to the audio-visual augmentation server 120.

The audio-visual augmentation server 120 generates instructions for the headset 110 on augmenting the audio-visual signals received from the headset 110. In some embodiments, the audio-visual augmentation server 120 performs a correspondence analysis of the visual signal of the field of view 140 and sound produced by the plurality of sound sources in the local area. From the correspondence analysis, the audio-visual augmentation server 120 identifies an audio signal and a portion of the visual signal that correspond to a single sound source. The audio-visual augmentation server 120 determines and compares strengths of the audio signal and the portion of the visual signal to determine a weak signal. In some embodiments, the user 130 provides the audio-visual augmentation server 120 with a selection of the weak signal. For example, in FIG. 1, the audio-visual augmentation server 120 may determine that the audio signal corresponding to the first person 150 is weak and difficult to understand, since the first person 150 faces away from the user 130. The audio-visual augmentation server 120 accordingly generates instructions to augment the weak audio signal and/or a portion of the visual signal corresponding to the first person 150 to help improve intelligibility of the weak audio signal for the user 130. In some embodiments, the instructions generated by the audio-visual augmentation server 120 also instruct the headset 110 to generate a haptic signal to help the user 130 comprehend the audio and/or visual signals corresponding to the first person 150. For example, the headset 110 may include haptic actuators that induce tactile signals. In other embodiments, a bracelet and/or ring accessory that communicatively couples to the headset 110 may include the haptic actuators. The tactile signals produced by the actuators may be modulated to correspond with an envelope of the audio signal, thereby providing additional perceptual input to the user 130. In some embodiments, the instructions generated by the audio-visual augmentation server 120 include the augmented audio and/or visual signals. Over the network 180, the audio-visual augmentation server 120 provides the headset 110 with the instructions for presentation as audio and/or visual content to the user.

Figure 2:
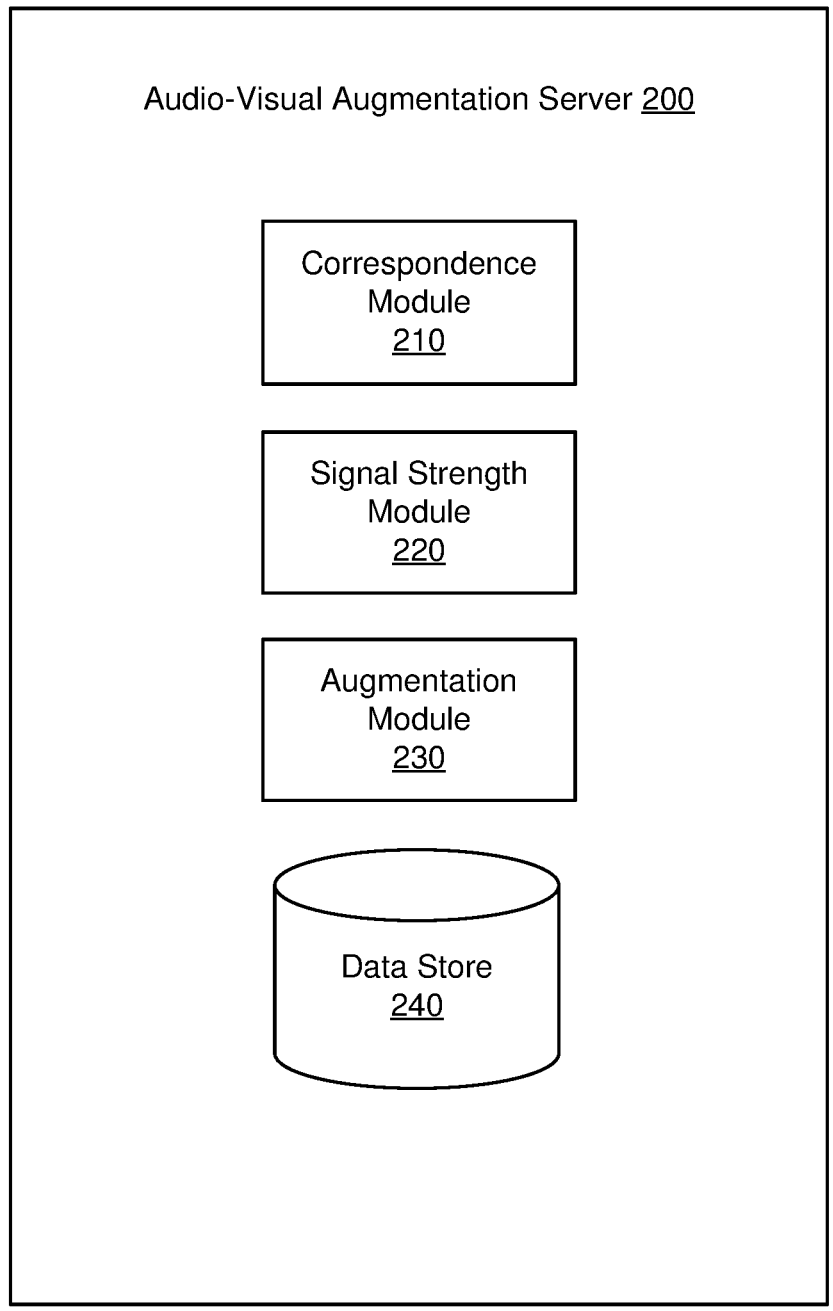
FIG. 2 is a block diagram of an audio-visual augmentation server, in accordance with one or more embodiments.
Figure 3:
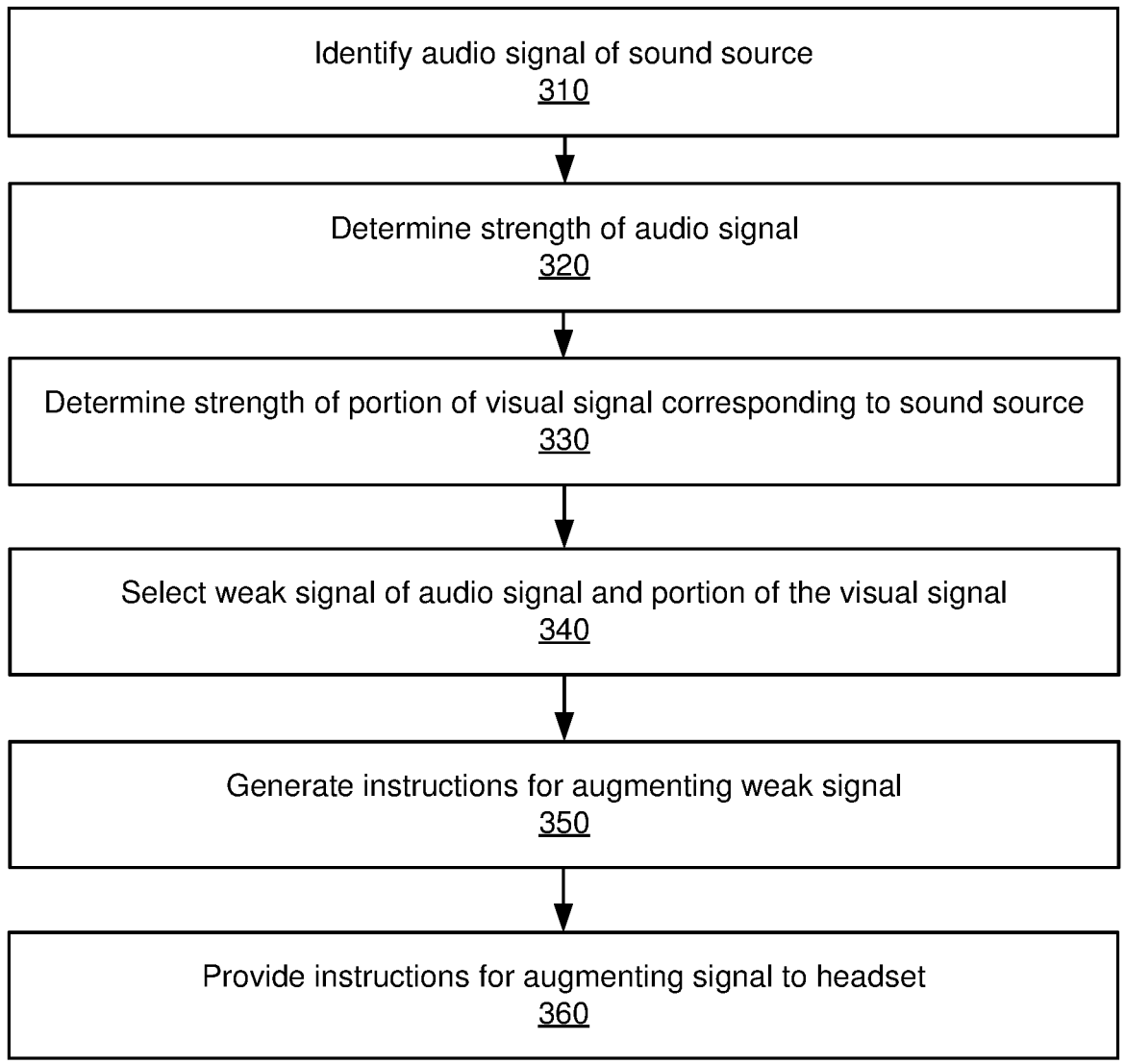
FIG. 3 is a flowchart illustrating a process for signal augmentation by an audio-visual augmentation server, in accordance with one or more embodiments.
Figure 5:
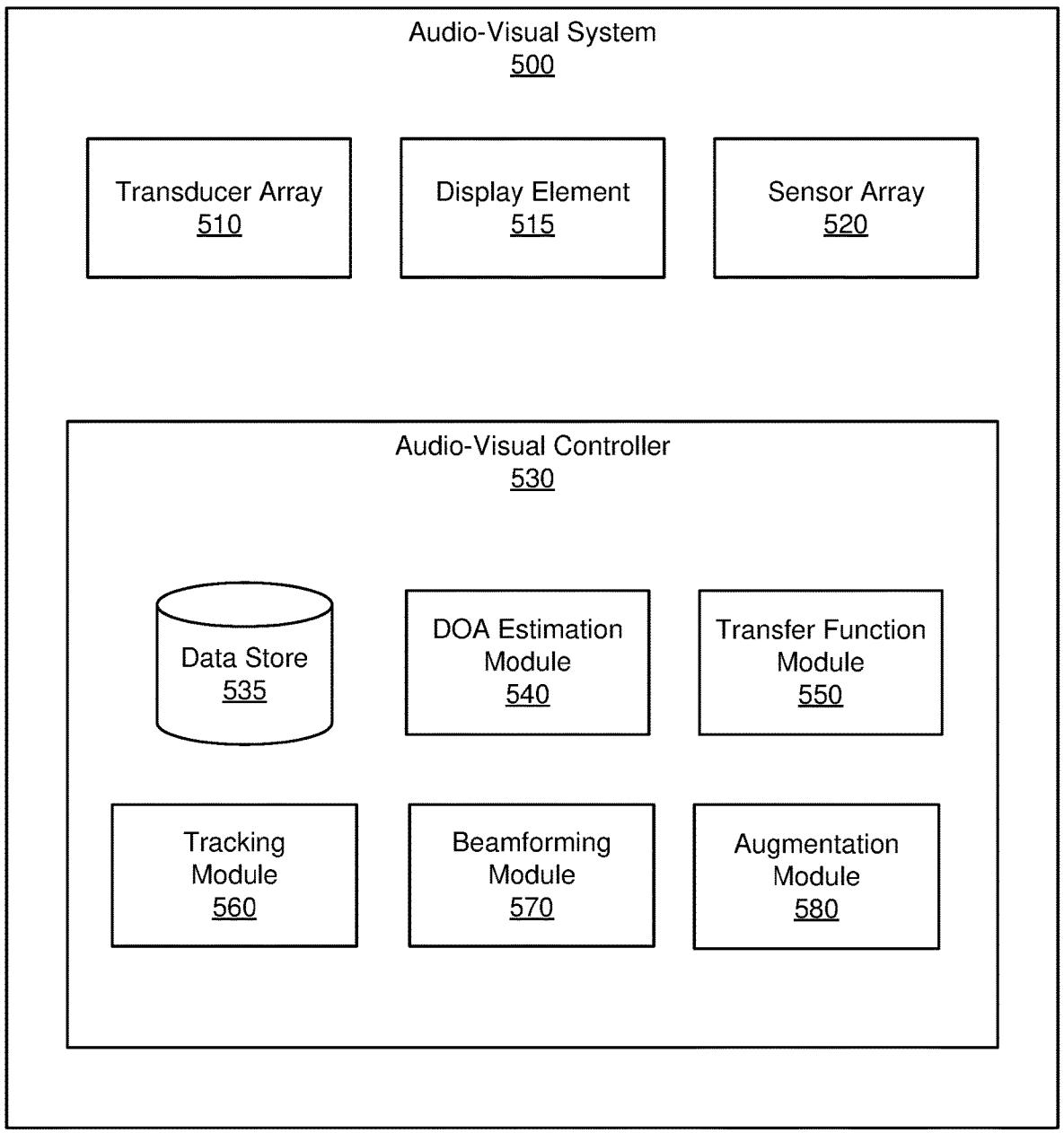
FIG. 5 is a block diagram of an audio-visual system, in accordance with one or more embodiments.

The headset 110 presents augmented audio and/or visual content to the user 130. The headset 110 augments the audio and/or visual signals as per the instructions received from the audio-visual augmentation server 120. In FIG. 1, the headset 110 presents an augmented visual content corresponding to the first person 150. The augmented visual signal includes a visual indicator 170 in proximity to the first person 150. The visual indicator 170 may change in size, color, position, and/or shape in correspondence with speech of the first person 150, thereby improving intelligibility of the audio signal. FIGS. 2-3 and 5 describe signal augmentation in further detail.

The network 180 couples the headset 110 and the audio-visual augmentation server 120. The network 180 may include any combination of local area and/or wide area networks using both wireless and/or wired communication systems. For example, the network 180 may include the Internet, as well as mobile telephone networks. In one embodiment, the network 180 uses standard communications technologies and/or protocols. Hence, the network 180 may include links using technologies such as Ethernet, 802.11, worldwide interoperability for microwave access (WiMAX), 2G/3G/4G/5G mobile communications protocols, digital subscriber line (DSL), asynchronous transfer mode (ATM), InfiniBand, PCI Express Advanced Switching, etc. Similarly, the networking protocols used on the network 180 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 180 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

Audio-Visual Signal Augmentation

FIG. 2 is a block diagram of an audio-visual augmentation server 200, in accordance with one or more embodiments. The audio-visual augmentation server 120 is an embodiment of the audio-visual augmentation server 200, and is configured to augment weak audio-visual signals for presentation to a user (e.g., the user 130) via an artificial reality headset (e.g., the headset 110). The audio-visual augmentation server 200 includes a correspondence module 210, a signal strength module 220, an augmentation module 230, and a data store 240. In some embodiments, the audio-visual augmentation server 200 includes components other than those shown here. The audio-visual augmentation server 200 may couple to (e.g., via a network) and/or be integrated within the headset.

The correspondence module 210 performs audio-visual correspondence analysis between a visual signal of a local area and sound produced by a plurality of sound sources in the local area. In some embodiments, the correspondence module 210 receives the sound and/or visual signal from a headset. For example, as shown in FIG. 1, the visual signal corresponds to the field of view 140 captured by the headset 110. The sound includes at least some of the sound produced within the captured field of view 140, and in some instances, may include sound from outside of the captured field of view 140. The sound corresponding to FIG. 1 may be produced by the first person 150 and the second person 160. The correspondence analysis results in an audio signal and a portion of the visual signal corresponding to a single sound source of the plurality of sound sources. The portion of the visual signal may be a set of pixels in the visual signal associated with the sound source. In some embodiments, the correspondence module 210 performs the correspondence analysis by identifying a portion of the visual signal, e.g., a set of pixels in the visual signal, that changes in values over a set of frames and correlating at least a portion of the sound captured over the set of frames with the identified set of pixels. Values monitored for changes include, for example, brightness, hue, luminance, and saturation. The correspondence module 210 also may identify the audio signal corresponding to the set of pixels with changing values by evaluating whether acoustic properties of the audio signal correspond to the changing values of the set of pixels. Acoustic properties include, for example, a frequency range, a modulation of frequency, average frequency, acoustic resonance, spectral peaks, loudness, and envelope. The correspondence module 210 may use, in some embodiments, a correlation detection model described in a paper published in 2016 in *Nature Communications* by Parise, C. and Ernst, M., titled "Correlation detection as a general mechanism for multisensory integration."

The signal strength module 220 determines a strength of the audio signal and a strength of the portion of the visual signal identified by the correspondence module 210 as corresponding to the sound source. In some embodiments, the signal strength module 220 uses signal-to-noise ratios to determine which of the audio signal and portion of the visual signal is weaker. The signal strength module 220 determines a signal-to-noise ratio of the audio signal by dividing a value of the audio signal by a value of audio noise detected by the headset. Similarly, the signal strength module 220 determines a signal-to-noise ratio of the portion of the visual signal by dividing a value of the portion of the visual signal by a value of visual noise detected by the headset. The signal may be identified based on spatial filtering, wherein a signal in the area of interest is compared to the noise. Noise may be determined based on a correlation between a plurality of microphones (e.g., the more correlated the signals from the plurality of microphones are, the less noise exists). In some embodiments, maximum likelihood cross validation (MLCV) methods may be used to identify speech (e.g., the signal), whereas non-speech would be considered noise. In some embodiments, the signal-to-noise ratio of the portion of the visual signal and/or the audio signal determined by a computer may differ from that estimated by humans. Accordingly, a perceptual model that estimates how people receive and process audio and/or visual stimuli may be used to improve an accuracy of the signal-to-noise ratio. The signal strength module 220 compares the audio signal's signal-to-noise ratio and the portion of the visual signal's signal-to-noise ratios. After the comparison of the signal-to-noise ratios, the signal strength module 220 selects the signal with the lower signal-to-noise ratio as the weaker signal. For example, after a comparison of the audio signal's signal-to-noise ratio and the portion of the visual signal's signal-to-noise ratio, the signal strength module 220 may determine that the portion of the visual signal's signal-to-noise ratio is weaker, and therefore provide the augmentation module 230 instructions to augment the portion of the visual signal. In some embodiments, the signal strength module 220 determines which of the audio and visual signal is weaker based on input from the user 130. The signal strength module 220 may receive the user input from the headset. In some embodiments, the signal strength module 220 compares the strength of the audio signal and/or visual signal to a threshold strength. If at least one of the audio and/or visual signal is below the threshold strength, the signal strength module 220 provides the weak signal to the augmentation module 230. In some embodiments, the signal strength module 220 may determine that a strength of the audio signal is equivalent and/or within a threshold of the visual signal, thereby resulting in no augmentation for the audio and/or visual signals. In such cases, the audio-visual augmentation server 200 generates instructions for the headset to present the originally captured audio and/or visual signals as content to the user.

The augmentation module 230 generates instructions for the headset on how to augment the weak signal identified by the signal strength module 220. In response to the signal strength module 220 determining that the audio and/or visual signal corresponding to the sound source is the weak signal, the augmentation module 230 generates the instructions for the headset on augmenting the audio signal and/or the visual signal. In some embodiments, the instructions generated by the augmentation module 230 include instructions to generate a haptic signal to improve intelligibility of the audio and/or visual signal. In some embodiments, the instructions generated by the augmentation module 230 include the augmented audio signal and/or the augmented visual signal. The instructions for augmenting an audio signal include instructions to modify the audio signal to improve its intelligibility. Augmenting the audio signal may include, for example, amplifying the audio signal, amplifying specific frequencies in the audio signal associated with the sound source, filtering out and/or attenuating portions of the audio signal that do not correspond to the sound source, modulating an envelope of the audio signal to recover modulation cues masked by noise and/or competing sound sources, applying source separation algorithms, some other modification of the audio signal to improve its intelligibility, or some combination thereof. Filters and/or audio signal augmentation other than those discussed here may also be applied to the audio signal. In some embodiments, the augmentation module 230 generates instructions for the weak signal by adjusting noise associated with the weak signal (e.g., determined by the signal strength module 220). For example, in response to the signal strength module 220 determining that the audio signal has a low signal-to-noise ratio, the augmentation module 230 may generate instructions to modulate noise associated with the audio signal to achieve an amplitude modulation of the noise that would improve intelligibility of the audio signal.

The instructions for augmenting the visual signal include instructions for modifying the visual signal to improve its and/or the audio signal's intelligibility. For example, augmenting the visual signal includes adding a visual indicator to the visual signal (e.g., the visual indicator 170), modifying properties of at least a portion of the visual signal, some other modification of the visual signal to improve its intelligibility, or some combination thereof. The visual indicator may be positioned proximate to (e.g., at most 5 feet from) the sound source. In some embodiments, visual indicator changes in position, brightness, contrast, hue, and/or shape in correspondence with the audio signal of the sound source. For example, the augmentation module 230 may augment the visual signal such that the visual indicator flashes at a rate consistent to a frequency modulation of the audio signal of the sound source. In other embodiments, the visual indicator may be ellipses, positioned proximate to the sound source, that are modulated with respect to the audio signal's amplitude envelope and/or spectral content. In some embodiments, the augmentation module 230 adds a visual indicator to the visual signal based on a type of the sound source. For example, when the sound source is a person, the visual indicator may be lips overlaid on the lips of the sound source, lips positioned proximate to the sound source, lips separate from the sound source, or some combination thereof, that move with the audio signal. Other examples of visual indicators may include augmented movements of the person's head, eyes, hands, or some combination thereof. Similarly, the augmentation module 230 may modify the visual signal to exaggerate (e.g., by enlarging them and/or modifying visual properties as discussed below) the lip movements of the sound source. In another example, when the sound source is a person turned away from the user 130, such as the first person 140, the augmentation module 230 may augment the visual signal to show the sound source's face to the user 130 at all times.

In some embodiments, the augmentation module 230 augments at least a portion of the visual signal by modifying properties (e.g., brightness, contrast, color, and sharpness) of the visual signal corresponding to the sound source. For example, the augmentation module 230 may brighten the portion of the visual signal corresponding to the sound source while dimming the other portions of the visual signal. Accordingly, the augmentation module 230 generates and provides instructions for augmenting the visual signal a to the headset such that the user can better comprehend the local area.

In some embodiments, the augmentation module 230 instructs the headset to generate haptic feedback and/or signals in correspondence with the audio signal and/or the portion of the visual signal. When the headset presents the haptic signal to the user in conjunction with the audio and/or visual signals, the user may experience better comprehension of the local area. For example, the augmentation module 230 may instruct the headset to slightly vibrate when the audio signal increases in amplitude (e.g., when a sound source grows louder in volume).

In some embodiments, the augmentation module 230 receives user input from the headset on the user's preferred method of augmentation. For example, the augmentation module 230 may receive, from the headset, a selection of properties of the visual indicator (e.g., shape, color, proximity to the sound source) and/or a preferred type of audio signal augmentation. The augmentation module 230 generates instructions for augmenting the audio and/or visual signals as per the received input.

The data store 240 stores data relevant to the audio-visual augmentation server 200. The data stored in the data store 240 may include, for example, received sound, visual signals, audio signals of respective sound sources, a depth map of the local area, a location of the headset, results of the correspondence analysis, determined strengths of audio and/or visual signals, augmented signals, instructions to provide to the headset on how to augment the audio and/or visual signals, some other information used by the audio-visual augmentation server 200 and/or one or more headsets, or some combination thereof.

FIG. 3 is a flowchart illustrating a process for signal augmentation by an audio-visual augmentation server, in accordance with one or more embodiments. The audio-visual augmentation server may be an embodiment of the audio-visual augmentation server 200. The audio-visual augmentation server receives a visual signal and sound from a headset (e.g., the headset 110). The visual signal depicts a local area surrounding a user (e.g., the user 130) wearing the headset, and the sound corresponds to that produced by several sound sources in the local area (e.g., the first person 150 and the second person 160). In some embodiments, some or all of the audio-visual augmentation server's functionality may be on the headset. In some embodiments, one or more of the steps described herein may be performed on the headset.

The audio-visual augmentation server identifies 310 an audio signal from the sound. The audio signal is specific to sound produced by a sound source of the several sound sources. The audio-visual augmentation server may identify the audio signal by a correspondence analysis of the visual signal and the sound. The audio-visual augmentation server also identifies a portion of the visual signal corresponding to the sound source via the correspondence analysis.

The audio-visual augmentation server determines 320 a strength of the audio signal of the sound source. In some embodiments, the strength of the audio signal corresponds to a signal-to-noise ratio of the audio signal.

The audio-visual augmentation server determines 330 a strength of the portion of the visual signal corresponding to the sound source. In some embodiments, the strength of the portion of the visual signal corresponds to a signal-to-noise ratio of the visual signal.

The audio-visual augmentation server selects 340 the weaker signal of the audio signal and the portion of the visual signal. In some embodiments, the selection of the weaker signal is based on the comparison of the signal-to-noise ratios of the audio signal and the portion of the visual signal. In some embodiments, the audio-visual augmentation server receives user input from the headset on which signal is weak.

The audio-visual augmentation server generates 350 instructions for augmenting the weak signal. Augmentation may include a modification of the audio and/or visual signal, and thereby may improve intelligibility of at least one of the signals. In some embodiments, the audio-visual augmentation server's instructions include the augmented audio and/or visual signal. In some embodiments, the audio-visual augmentation server may generate instructions for generating a haptic signal to improve the intelligibility of the audio and/or visual signal. Augmenting the audio signal includes amplifying and/or applying sound filters to the audio signal, for example. Augmenting the visual signal includes adding a visual indicator (e.g., the visual indicator 170) to the visual signal and/or modifying properties of the visual signal (e.g., brightness, contrast, color, sharpness). In some embodiments, augmenting the visual signal includes adding dynamic visual manipulations to the visual signal, such as adding a flicker or additional motion, and/or suppressing (e.g., blurring, darkening, fading, etc.) portions of the visual signal that do not correspond to the audio signal.

The audio-visual augmentation server provides 360 the instructions for augmenting the signal to the headset. The headset augments the audio and/or visual signals as per the received instructions and accordingly presents augmented audio-visual content to the user.

After the headset presents to the user the augmented audio-visual content, in conjunction with other signals captured by the headset and/or those received from the audio-visual augmentation server, the user may better comprehend the local area. The augmented audio and/or visual signals may provide additional audio and/or visual cues (e.g., by way of the visual indicator) that assist in the cognitive processing of the local area. In some embodiments, as described above, the headset may also provide the headset with haptic signals in correspondence with the audio and/or visual signal, improving the contexts in which the user perceives the local area, and thereby improving intelligibility of audio and/or visual signals of the local area.

Artificial Reality Headset and Audio-Visual System

Figure 4A:
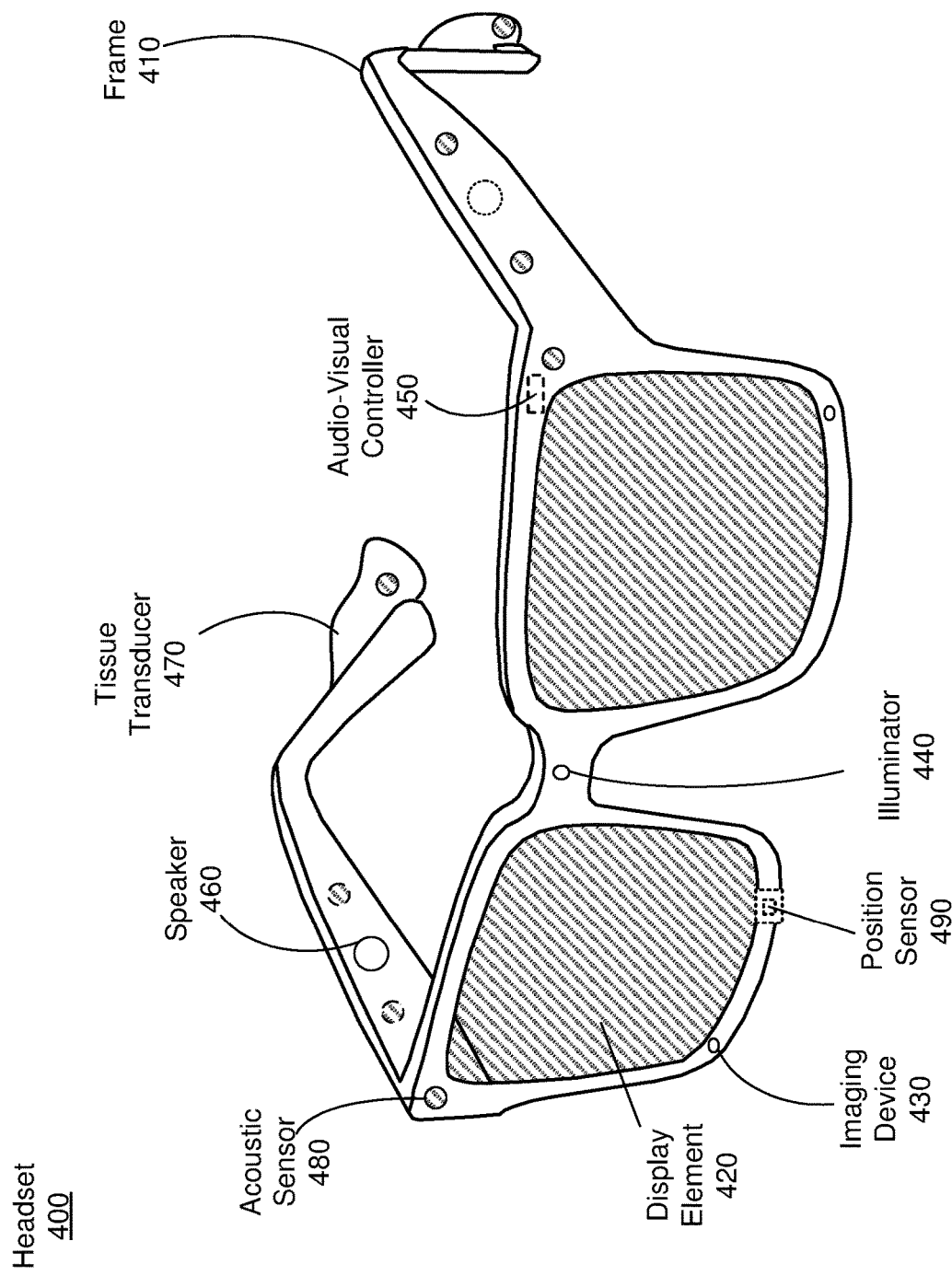
FIG. 4A is a perspective view of a headset implemented as an eyewear device, in accordance with one or more embodiments.

FIG. 4A is a perspective view of a headset 400 implemented as an eyewear device, in accordance with one or more embodiments. In some embodiments, the eyewear device is a near eye display (NED). In general, the headset 400 may be worn on the face of a user such that content (e.g., media content) is presented using a display assembly and/or an audio system. However, the headset 400 may also be used such that media content is presented to a user in a different manner. Examples of media content presented by the headset 400 include one or more images, video, audio, or some combination thereof. The headset 400 includes a frame 410, and a position sensor 415, and may include, among other components, an audio-visual system. The audio-visual system includes a display assembly including one or more display elements 420, a depth camera assembly (DCA), an audio system, and an audio-visual controller 450. While FIG. 4A illustrates the components of the headset 400 in example locations on the headset 400, the components may be located elsewhere on the headset 400, on a peripheral device paired with the headset 400, or some combination thereof. Similarly, there may be more or fewer components on the headset 400 than what is shown in FIG. 4A. As described with respect to FIGS. 1-3, a headset (e.g., the headset 110) may provide an artificial reality experience to a user to improve intelligibility of received audio and/or visual signals. The user may wear the headset in a local area with a plurality of sound sources.

The frame 410 holds the other components of the headset 400. The frame 410 includes a front part that holds the one or more display elements 420 and end pieces (e.g., temples) to attach to a head of the user. The front part of the frame 410 bridges the top of a nose of the user. The length of the end pieces may be adjustable (e.g., adjustable temple length) to fit different users. The end pieces may also include a portion that curls behind the ear of the user (e.g., temple tip, ear piece).

The position sensor 415 generates one or more measurement signals in response to motion of the headset 400. The position sensor 415 may be located on a portion of the frame 410 of the headset 400. The position sensor 415 may include an inertial measurement unit (IMU). Examples of position sensor 415 include: one or more accelerometers, one or more gyroscopes, one or more magnetometers, another suitable type of sensor that detects motion, a type of sensor used for error correction of the MU, or some combination thereof. The position sensor 415 may be located external to the IMU, internal to the IMU, or some combination thereof.

In some embodiments, the headset 400 may provide for simultaneous localization and mapping (SLAM) for a position of the headset 400 and updating of a model of the local area. For example, the headset 400 may include a passive camera assembly (PCA) that generates color image data. The PCA may include one or more RGB cameras that capture images of some or all of the local area. In some embodiments, some or all of the imaging devices 430 of the DCA may also function as the PCA. The images captured by the PCA and the depth information determined by the DCA may be used to determine parameters of the local area, generate a model of the local area, update a model of the local area, or some combination thereof. Furthermore, the position sensor 415 tracks the position (e.g., location and pose) of the headset 400 within the room. Additional details regarding the components of the headset 400 are discussed below in connection with FIG. 7.

The audio-visual system presents audio-visual content to a user wearing the headset 400. The audio-visual system includes the one or more display elements 420, a depth camera assembly (DCA), an audio system, and an audio-visual controller 450. The audio-visual system may include other components not shown in FIGS. 4A-B. For example, in some embodiments, the headset 400 may also include a thermal camera that captures temperatures associated with the local area surrounding the user.

The one or more display elements 420 provide light to a user wearing the headset 400. As illustrated the headset includes a display element 420 for each eye of a user. In some embodiments, a display element 420 generates image light that is provided to an eyebox of the headset 400. The eyebox is a location in space that an eye of user occupies while wearing the headset 400. For example, a display element 420 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 400. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 420 are opaque and do not transmit light from a local area around the headset 400. The local area is the area surrounding the headset 400. For example, the local area may be a room that a user wearing the headset 400 is inside, or the user wearing the headset 400 may be outside and the local area is an outside area. In this context, the headset 400 generates VR content. Alternatively, in some embodiments, one or both of the display elements 420 are at least partially transparent, such that light from the local area may be combined with light from the one or more display elements to produce AR and/or MR content.

In some embodiments, a display element 420 does not generate image light, and instead is a lens that transmits light from the local area to the eyebox. For example, one or both of the display elements 420 may be a lens without correction (non-prescription) or a prescription lens (e.g., single vision, bifocal and trifocal, or progressive) to help correct for defects in a user's eyesight. In some embodiments, the display element 420 may be polarized and/or tinted to protect the user's eyes from the sun.

In some embodiments, the display element 420 may include an additional optics block (not shown). The optics block may include one or more optical elements (e.g., lens, Fresnel lens, etc.) that direct light from the display element 420 to the eyebox. The optics block may, e.g., correct for aberrations in some or all of the image content, magnify some or all of the image, or some combination thereof. In some embodiments, the display element 420 presents the user with a field of view (e.g., the field of view 140) of the local area. In some embodiments, the display element 420 presents augmented visual content to the user as per instructions received from the audio-visual controller 450.

The DCA determines depth information for a portion of a local area surrounding the headset 400. The DCA includes one or more imaging devices 430 and a DCA controller (not shown in FIG. 4A), and may also include an illuminator 440. In some embodiments, the illuminator 440 illuminates a portion of the local area with light. The light may be, e.g., structured light (e.g., dot pattern, bars, etc.) in the infrared (IR), IR flash for time-of-flight, etc. In some embodiments, the one or more imaging devices 430 capture images of the portion of the local area that include the light from the illuminator 440. As illustrated, FIG. 4A shows a single illuminator 440 and two imaging devices 430. In alternate embodiments, there is no illuminator 440 and at least two imaging devices 430.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 440), some other technique to determine depth of a scene, or some combination thereof.

The DCA may include an eye tracking unit that determines eye tracking information. The eye tracking information may comprise information about a position and an orientation of one or both eyes (within their respective eye-boxes). The eye tracking unit may include one or more cameras. The eye tracking unit estimates an angular orientation of one or both eyes based on images captures of one or both eyes by the one or more cameras. In some embodiments, the eye tracking unit may also include one or more illuminators that illuminate one or both eyes with an illumination pattern (e.g., structured light, glints, etc.). The eye tracking unit may use the illumination pattern in the captured images to determine the eye tracking information. The headset 400 may prompt the user to opt in to allow operation of the eye tracking unit. For example, by opting in the headset 400 may detect, store, images of the user's any or eye tracking information of the user.

The audio system provides audio content. The audio system includes a transducer array and a sensor array. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 460 or a tissue transducer 470 (e.g., a bone conduction transducer or a cartilage conduction transducer). Although the speakers 460 are shown exterior to the frame 410, the speakers 460 may be enclosed in the frame 410. In some embodiments, instead of individual speakers for each ear, the headset 400 includes a speaker array comprising multiple speakers integrated into the frame 410 to improve directionality of presented audio content. The tissue transducer 470 couples to the head of the user and directly vibrates tissue (e.g., bone or cartilage) of the user to generate sound. The number and/or locations of transducers may be different from what is shown in FIG. 4A.

The sensor array detects sounds within the local area of the headset 400. The sensor array includes a plurality of acoustic sensors 480. An acoustic sensor 480 captures sounds emitted from one or more sound sources in the local area (e.g., a room). Each acoustic sensor is configured to detect sound and convert the detected sound into an electronic format (analog or digital). The acoustic sensors 480 may be acoustic wave sensors, microphones, sound transducers, or similar sensors that are suitable for detecting sounds.

In some embodiments, one or more acoustic sensors 480 may be placed in an ear canal of each ear (e.g., acting as binaural microphones). In some embodiments, the acoustic sensors 480 may be placed on an exterior surface of the headset 400, placed on an interior surface of the headset 400, separate from the headset 400 (e.g., part of some other device), or some combination thereof. The number and/or locations of acoustic sensors 480 may be different from what is shown in FIG. 4A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 400.

The audio-visual controller 450 processes information from the sensor array and one or more imaging devices 430 describing the local area. The audio-visual controller 450 may comprise a processor and a computer-readable storage medium. The audio-visual controller 450 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 460, or some combination thereof. For example, the audio-visual controller 450 may determine an audio signal of a specific sound source in the local area using beamforming and/or DOA techniques. In some embodiments, the audio-visual controller 450 may be configured to perform a correspondence analysis between the audio content of the plurality of sound sources and the visual signal describing the local area. The audio-visual controller 450 may identify the audio signal and a portion of the visual signal corresponding to the sound source as a result of the correspondence analysis. The audio-visual controller 450 may determine which of the audio signal and/or the portion of the visual signal is weaker, augment the weak signal, and present the augmented audio and/or visual content to the user. For example, the audio-visual controller 450 may instruct the display element 420 to present augmented visual content to the user, and the transducer array of the audio system to present augmented audio content to the user.

In some embodiments, the audio-visual controller 450 couples to the audio-visual augmentation server 200 of FIG.

2, receives instructions generated by the audio-visual augmentation server 200, and augments the audio and/or visual signals accordingly. The audio-visual controller 450 accordingly instructs the display element 420 and/or the speaker 460 and/or the transducer array of the audio system to present the user with augmented audio-visual content.

Figure 4B:
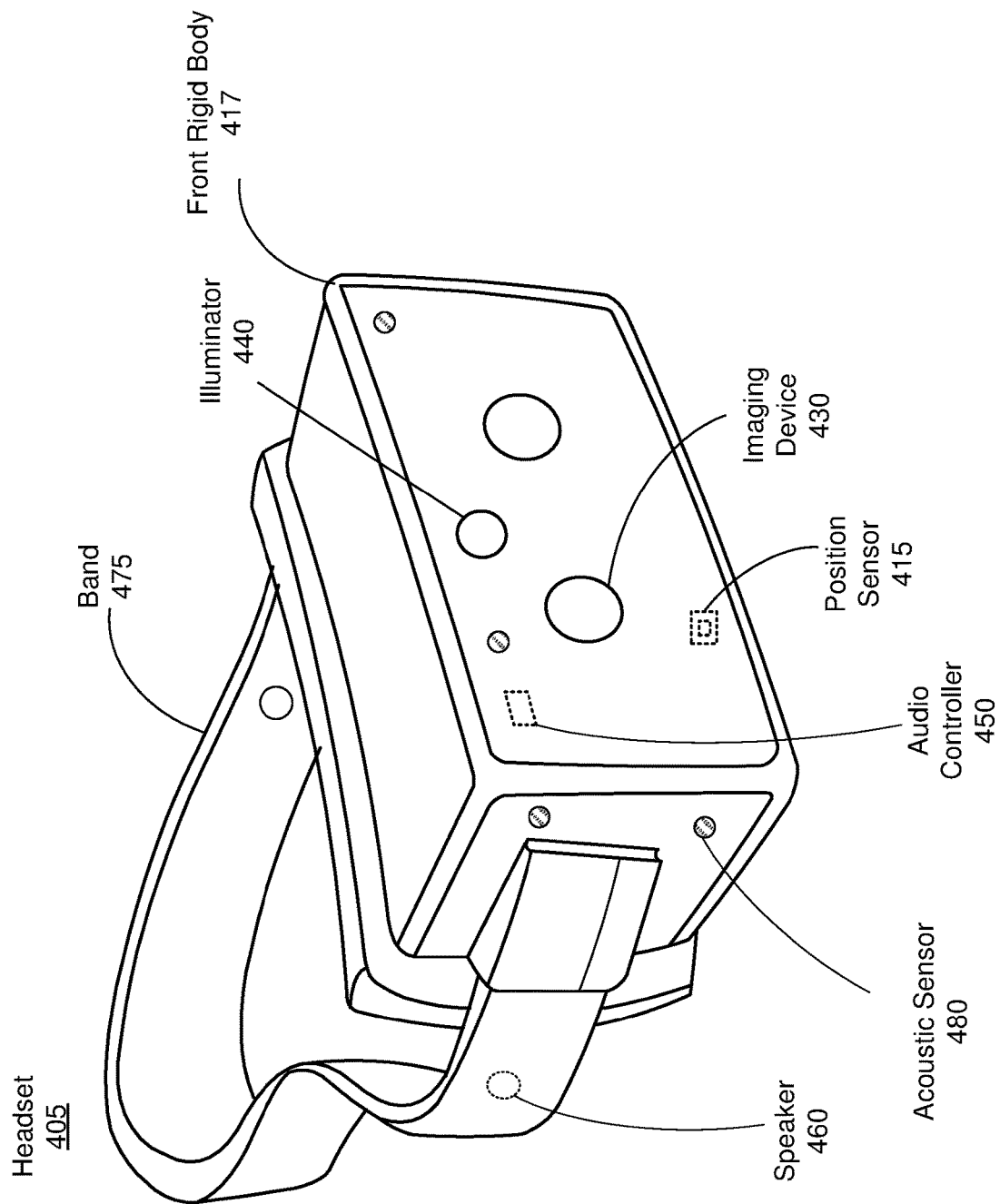
FIG. 4B is a perspective view of a headset implemented as a head-mounted display, in accordance with one or more embodiments.

FIG. 4B is a perspective view of a headset 405 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 417 and a band 475. The headset 405 includes many of the same components described above with reference to FIG. 4A, but modified to integrate with the HMD form factor. The HMD includes an audio-visual system substantially similar to that described with respect to FIG. 4A. FIG. 4B shows the position sensor 415, the illuminator 440, a plurality of the speakers 460, a plurality of the imaging devices 430, and a plurality of acoustic sensors 480. The speakers 460 may be located in various locations, such as coupled to the band 475 (as shown), coupled to the front rigid body 417, or may be configured to be inserted within the ear canal of a user.

FIG. 5 is a block diagram of an audio-visual system 500, in accordance with one or more embodiments. The audio-visual system described with respect to FIGS. 4A and 4B may be components and/or embodiments of the audio-visual system 500. The audio-visual system 500 processes and augments audio and/or visual signals for presentation to a user. The audio-visual systems of the headset 400 and/or the headset 405 are embodiments of the audio-visual system 500. In the embodiment shown in FIG. 5, the audio-visual system 500 includes a transducer array 510, a display element 515, a sensor array 520, and an audio-visual controller 530. Some embodiments of the audio-visual system 500 have different components than those described here. Similarly, in some cases, functions can be distributed among the components in a different manner than is described here. In some embodiments, the transducer array 510, the display element 515, the sensor array 520, or some combination thereof, may be separate from the audio-visual system 500.

The transducer array 510 is configured to present audio content. The transducer array 510 includes a plurality of transducers. A transducer is a device that provides audio content. A transducer may be, e.g., a speaker (e.g., the speaker 460), a tissue transducer (e.g., the tissue transducer 470), some other device that provides audio content, or some combination thereof. A tissue transducer may be configured to function as a bone conduction transducer or a cartilage conduction transducer. The transducer array 510 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 510 may include one or more transducers to cover different parts of a frequency range. For example, a piezoelectric transducer may be used to cover a first part of a frequency range and a moving coil transducer may be used to cover a second part of a frequency range. The transducer array 510 is also configured to present an augmented audio signal to the user.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio-visual controller 530, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 510 generates audio content in accordance with instructions from the audio-visual controller 530. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio-visual system 500. The transducer array 510 may be coupled to a wearable device (e.g., the headset 400 or the headset 405). In alternate embodiments, the transducer array 510 may be a plurality of speakers that are separate from the wearable device (e.g., coupled to an external console).

The display element 515 presents visual content to the user. In some embodiments, the visual content is augmented as per instructions from the audio-visual controller 530. The display element 515 may be an embodiment of the display element 420 described with respect to FIGS. 4A and 4B.

The sensor array 520 captures sound and a visual signal describing a local surrounding the sensor array 520. The sound from the local area may be produced by a plurality of sound sources. The visual signal may correspond to a field of view of the local area captured by a headset (e.g., the headsets 400 and 405). The sensor array 520 may include a plurality of imaging devices and/or acoustic sensors. The imaging devices, such as the imaging devices 430 described with respect to FIGS. 4A-B, capture one or more images or a video feed that describe the local area. The acoustic sensors each detect air pressure variations of a sound wave and convert the detected sounds into an electronic format (analog or digital). An acoustic sensor may be, e.g., a microphone, a vibration sensor, an accelerometer, or any combination thereof. The plurality of acoustic and/or imaging devices may be positioned on a headset (e.g., headset 400 and/or the headset 405), on a user (e.g., in an ear canal of the user), on a neckband, or some combination thereof. In some embodiments, the sensor array 520 is configured to monitor the audio content generated by the transducer array 510 using at least some of the plurality of acoustic sensors. Increasing the number of imaging devices and/or acoustic sensors may improve the accuracy of information (e.g., directionality) describing the local area.

The audio-visual controller 530 controls operation of the audio-visual system 500. In the embodiment of FIG. 2, the audio-visual controller 530 includes a data store 535, a DOA estimation module 540, a transfer function module 550, a tracking module 560, a beamforming module 570, and an augmentation module 580. The audio-visual controller 530 may be located inside a headset (e.g., the headsets 400 and 405), in some embodiments. Some embodiments of the audio-visual controller 530 have different components than those described here. Similarly, functions can be distributed among the components in different manners than described here. For example, some functions of the audio-visual controller 530 may be performed external to the headset. The user may opt in to allow the audio-visual controller 530 to transmit data captured by the headset to systems external to the headset, and the user may select privacy settings controlling access to any such data.

The data store 535 stores data for use by the audio-visual system 500. Data in the data store 535 may include the visual signal of the local area, sounds recorded in the local area of the audio-visual system 500, audio content, head-related transfer functions (HRTFs), transfer functions for one or more sensors, array transfer functions (ATFs) for one or more of the acoustic sensors, sound source locations, virtual model of local area, direction of arrival estimates, sound filters, and other data relevant for use by the audio-visual system 500, or any combination thereof. The data store 535 also stores for example, received audio content, visual signals, results of correspondence analysis, determined strengths of audio and/or visual signals, user input on the audio and/or visual signals, instructions on how to augment the audio and/or visual signals, the augmented signals, some other information for use by the audio-visual system 500 and/or one or more headsets, or some combination thereof.

The DOA estimation module 540 is configured to localize sound sources in the local area based in part on information from the sensor array 520. Localization is a process of determining where sound sources are located relative to the user of the audio-visual system 500. The DOA estimation module 540 performs a DOA analysis to localize one or more sound sources within the local area. The DOA analysis may include analyzing the intensity, spectra, and/or arrival time of each sound at the sensor array 520 to determine the direction from which the sounds originated. In some cases, the DOA analysis may include any suitable algorithm for analyzing a surrounding acoustic environment in which the audio-visual system 500 is located.

For example, the DOA analysis may be designed to receive input signals from the sensor array 520 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 520 received the direct-path audio signal. The determined angle may then be used to identify the DOA for the received input signal. Other algorithms not listed above may also be used alone or in combination with the above algorithms to determine DOA.

In some embodiments, the DOA estimation module 540 may also determine the DOA with respect to an absolute position of the audio-visual system 500 within the local area. The position of the sensor array 520 may be received from an external system (e.g., some other component of a headset, an artificial reality console, a mapping server, a position sensor (e.g., the position sensor 415), etc.). The external system may create a virtual model of the local area, in which the local area and the position of the audio-visual system 500 are mapped. The received position information may include a location and/or an orientation of some or all of the audio-visual system 500 (e.g., of the sensor array 520). The DOA estimation module 540 may update the estimated DOA based on the received position information.

The transfer function module 550 is configured to generate one or more acoustic transfer functions. Generally, a transfer function is a mathematical function giving a corresponding output value for each possible input value. Based on parameters of the detected sounds, the transfer function module 550 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 520. Accordingly, for a sound source there is a corresponding transfer function for each of the acoustic sensors in the sensor array 520. And collectively the set of transfer functions is referred to as an ATF. Accordingly, for each sound source there is a corresponding ATF. Note that the sound source may be, e.g., someone or something generating sound in the local area, the user, or one or more transducers of the transducer array 510. The ATF for a particular sound source location relative to the sensor array 520 may differ from user to user due to a person's anatomy (e.g., ear shape, shoulders, etc.) that affects the sound as it travels to the person's ears. Accordingly, the ATFs of the sensor array 520 are personalized for each user of the audio-visual system 500.

In some embodiments, the transfer function module 550 determines one or more HRTFs for a user of the audio-visual system 500. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 550 may determine HRTFs for the user using a calibration process. In some embodiments, the transfer function module 550 may provide information about the user to a remote system. The user may adjust privacy settings to allow or prevent the transfer function module 550 from providing the information about the user to any remote systems. The remote system determines a set of HRTFs that are customized to the user using, e.g., machine learning, and provides the customized set of HRTFs to the audio-visual system 500.

The tracking module 560 is configured to track locations of one or more sound sources. The tracking module 560 may compare current DOA estimates and compare them with a stored history of previous DOA estimates. In some embodiments, the audio-visual system 500 may recalculate DOA estimates on a periodic schedule, such as once per second, or once per millisecond. The tracking module may compare the current DOA estimates with previous DOA estimates, and in response to a change in a DOA estimate for a sound source, the tracking module 560 may determine that the sound source moved. In some embodiments, the tracking module 560 may detect a change in location based on visual information received from the headset or some other external source. The tracking module 560 may track the movement of one or more sound sources over time. The tracking module 560 may store values for a number of sound sources and a location of each sound source at each point in time. In response to a change in a value of the number or locations of the sound sources, the tracking module 560 may determine that a sound source moved. The tracking module 560 may calculate an estimate of the localization variance. The localization variance may be used as a confidence level for each determination of a change in movement.

The beamforming module 570 is configured to process one or more ATFs to selectively emphasize sounds from sound sources within a certain area while de-emphasizing sounds from other areas. In analyzing sounds detected by the sensor array 520, the beamforming module 570 may combine information from different acoustic sensors to emphasize sound associated from a particular region of the local area while deemphasizing sound that is from outside of the region. The beamforming module 570 may isolate an audio signal associated with sound from a particular sound source from other sound sources in the local area based on, e.g., different DOA estimates from the DOA estimation module 540 and the tracking module 560. The beamforming module 570 may thus selectively analyze discrete sound sources in the local area. In some embodiments, the beamforming module 570 may enhance a signal from a sound source. For example, the beamforming module 570 may apply sound filters which eliminate signals above, below, or between certain frequencies. Signal enhancement acts to enhance sounds associated with a given identified sound source relative to other sounds detected by the sensor array 520. In some embodiments, the audio-visual controller 530 isolates an audio signal of a sound source, from sound produced by a plurality of sound sources, in the local area using the DOA estimation module 540, the transfer function module 550, the tracking module 560, the beamforming module 570, or some combination thereof.

The augmentation module 580 augments audio and/or visual signals. In some embodiments, the augmentation module 580 augments the audio and/or visual signals based on instructions received from an audio-visual augmentation server (e.g., the audio-visual augmentation server 200). The augmentation module 580 may also generate a haptic signal based on the received instructions. The augmentation module 580 provides the one or more augmented signals and/or the haptic signal to a headset (e.g., the headsets 400 and 405) for presentation as augmented audio-visual content to the user of the headset.

In some embodiments, the augmentation module 580 processes the audio and/or visual signals and augments the audio and/or visual signals accordingly. The audio signal and/or the visual signal may be captured by the sensor array 520. The augmentation module 580 identifies an audio signal and a portion of a visual signal of the local area corresponding to a single sound source. The augmentation module 580 may identify the audio signal and/or the portion of the visual signal by correspondence analysis of the sound produced by a plurality of sound sources and the visual signal of the local area. The correspondence analysis performed may be substantially similar to steps performed by correspondence module 210 of the audio-visual augmentation server 200 in FIG. 2.

The augmentation module 580 may determine a weak signal of the audio signal and the portion of the visual signal corresponding to the sound source. The process by which the augmentation module 580 determines and compares the strengths of the audio and/or visual signals may be similar to that performed by the signal strength module 220 of the audio-visual augmentation server 200 in FIG. 2. In some embodiments, a user provides input, via a headset and/or a separate client device of the user, for example, to the audio-visual system 500 on which signal is weak. In other embodiments, the augmentation module 480 is configured to detect, via the sensor assembly 520, for example, movements of the user and identify the specific inputs that each movement corresponds to. For example, the augmentation module 480 may determine that the user raising a single hand is indicative of a weak visual signal, while raising both hands is indicative of a weak audio signal. In some embodiments, the augmentation module 480 receives input from the user through auditory instructions that are captured via the sensor array 520. For example, the user may speak out loud to a headset, specifying which signal is weak.

In response to determining which of the signals is weak, the augmentation module 580 augments the weak signal. In some embodiments, the audio signal is augmented, such as by applying sound filters to the audio signal. For example, the sound filters may cause the audio content to be spatialized, such that the audio content appears to originate from a target region. In some embodiments, the augmentation module 580 may use HRTFs and/or acoustic parameters that describe acoustic properties of the local area to generate the sound filters.

In other embodiments, at least the portion of the visual signal corresponding to the sound source is augmented, such as by adding a visual indicator that moves in conjunction with the audio signal. The augmentation module 230 of the audio-visual augmentation server 200 in FIG. 2 describes audio augmentation and visual augmentation in further detail.

The augmentation module 580 provides the one or more augmented signals to the transducer array 510 and/or the display element 515. The transducer array 510 and/or the display element 515 present the augmented signals to the user as augmented audio-visual content. In some embodiments, the augmentation module 580 provides a haptic signal to a haptic device coupled to the audio-visual system 500; the haptic device presents the haptic signal to the user. The user subsequently perceives the augmented signals, provided to the headset by the augmented signal rendering module 595, as well as other non-augmented signals. As a result, the user may experience improved comprehension and intelligibility of the audio and/or visual signals of the local area.

In some embodiments, the augmentation module 580 is configured to adjust the augmented audio-visual content based on the user's proximity and position relative to the sound sources in the local area. For example, if the user, wearing a headset coupled to the audio-visual system 500, walks closer to a sound source and can therefore hear the corresponding audio signal better, the augmentation module 580 may automatically adjust the level of audio signal augmentation. Similarly, if the user walks further from the sound source, the augmentation module 580 may automatically scale the visual indicator and adjusts the level of audio signal augmentation accordingly.

Figure 6:
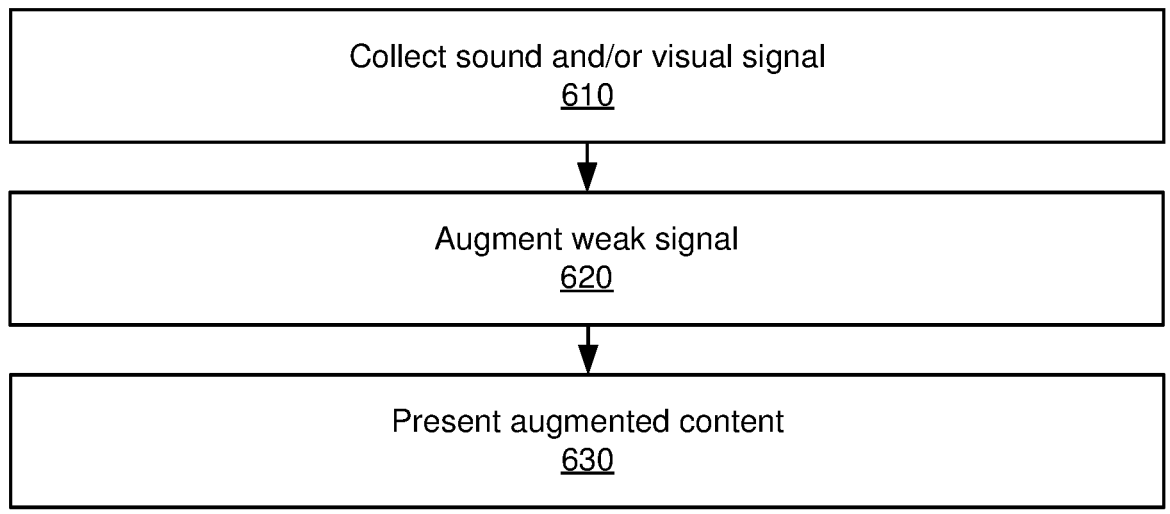
FIG. 6 is a flowchart illustrating a process for signal augmentation by the headsets of FIGS. 4A-B, in accordance with one or more embodiments.

FIG. 6 is a flowchart illustrating a process for signal augmentation on a headset, in accordance with one or more embodiments. The headset may be, e.g., the headset 400, the headset 405, or some other headset with the audio-visual system 500 of FIG. 5. In some embodiments, some or all the steps of FIG. 3 may also be performed by the headset.

The headset collects 610 sound from and/or a visual signal of a local area. The sound includes sound produced by a plurality of sound sources in the local area; the visual signal is an image and/or video feed of the local area. The headset provides the sound and/or the visual signal to an audio-visual augmentation server (e.g., the audio-visual augmentation server 200) for the server to process the signals and generate instructions for the headset on how to augment one or more of the signals.

In other embodiments, the headset identifies an audio signal of the sound, the audio signal corresponding to a single sound source. The headset may compare a strength of the audio and/or visual signal to determine which of the signals is weak. In some embodiments, the headset calculates a signal-to-noise ratio of each of the audio and visual signals, and then compares each of the signal-to-noise ratios. Based on the comparison, the headset selects the weak signal. In some embodiments, a user of the headset provides the headset with input on which signal is weak.

The headset augments 620 the weak signal. In some embodiments, the headset augments the weak signal as per instructions received from the audio-visual augmentation server. In some embodiments, the headset augments the audio signal by adjusting the amplitude and/or applying filters to the audio signal to suppress sounds from other sound sources in the local area, for example. The headset may augment the audio signal by adding a visual indicator to the visual signal to improve intelligibility of sound produced by the sound source. In some embodiments, the headset augments the visual signal, such as by adding a visual indicator to the visual signal. In some embodiments, the headset generates a haptic signal to improve the intelligibility of sounds and visuals of the local area.

The headset presents 630 augmented content to the user of the headset. The augmented content may be based on the augmented audio and/or visual signals; in some embodiments, the headset presents a haptic signal to supplement the augmented audio and/or visual signal. The user, after being presented the augmented content, may experience improved perception of the local area as a result of improved intelligibility of the audio and/or visual signals. For example, the user may be able to better understand the local area and/or the sound source within the local area.

Figure 7:
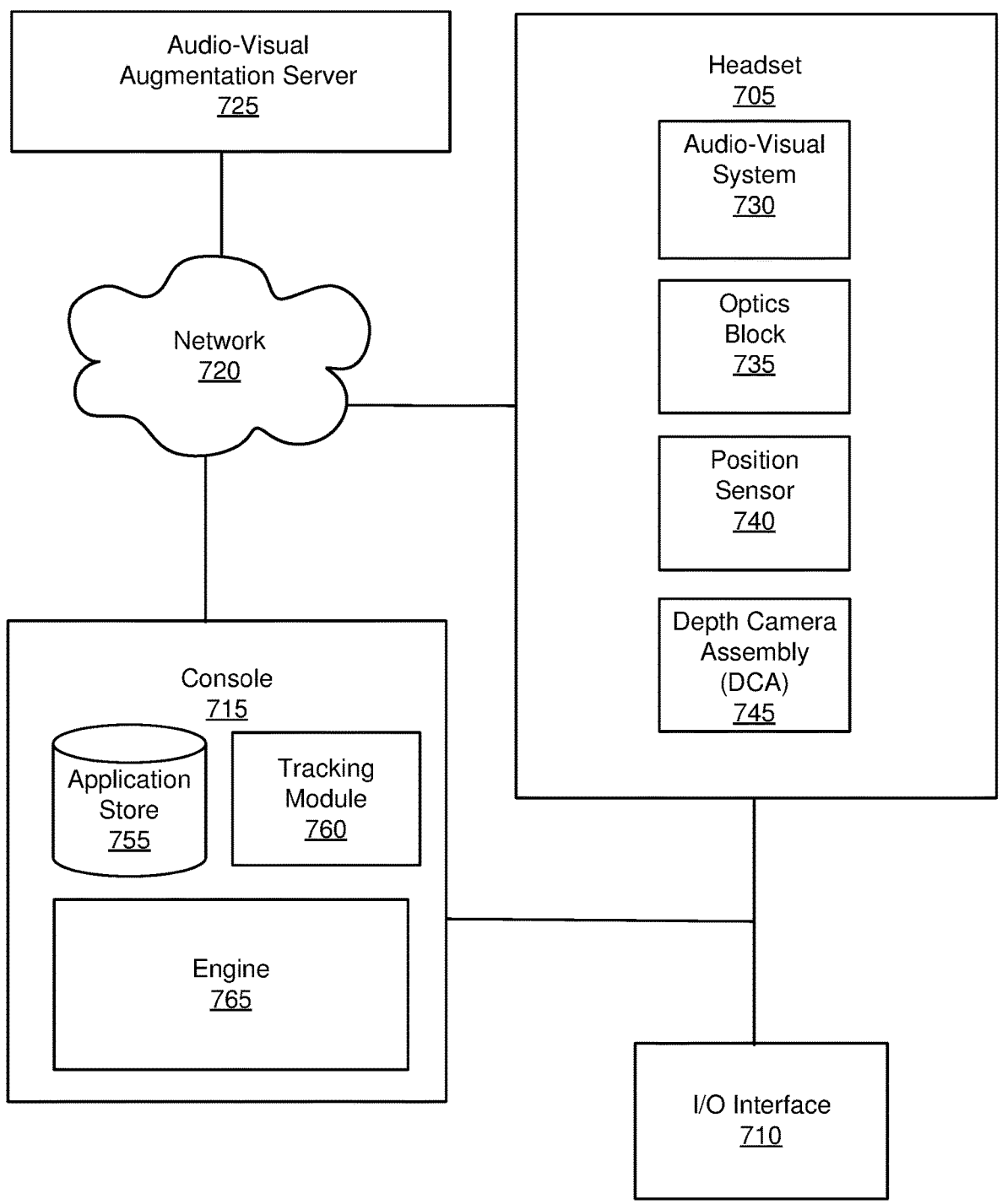
FIG. 7 is a system that includes a headset, in accordance with one or more embodiments.

FIG. 7 is a system 700 that includes a headset 705, in accordance with one or more embodiments. In some embodiments, the headset 705 may be the headset 400 of FIG. 4A or the headset 405 of FIG. 4B. The system 700 may operate in an artificial reality environment (e.g., a virtual reality environment, an augmented reality environment, a mixed reality environment, or some combination thereof). The system 700 shown by FIG. 7 includes the headset 705, an input/output (I/O) interface 710 that is coupled to a console 715, the network 720, and the audio-visual augmentation server 725. While FIG. 7 shows an example system 700 including one headset 705 and one I/O interface 710, in other embodiments any number of these components may be included in the system 700. For example, there may be multiple headsets each having an associated I/O interface 710, with each headset and I/O interface 710 communicating with the console 715. In alternative configurations, different and/or additional components may be included in the system 700. Additionally, functionality described in conjunction with one or more of the components shown in FIG. 7 may be distributed among the components in a different manner than described in conjunction with FIG. 7 in some embodiments. For example, some or all of the functionality of the console 715 may be provided by the headset 705.

The headset 705 includes an audio-visual system 730, which includes a display assembly and an audio system, as well as an optics block 735, one or more position sensors 740, and a DCA 745. Some embodiments of headset 705 have different components than those described in conjunction with FIG. 7. Additionally, the functionality provided by various components described in conjunction with FIG. 7 may be differently distributed among the components of the headset 705 in other embodiments, or be captured in separate assemblies remote from the headset 705.

The audio-visual system 730 presents augmented audio-visual content to a user of the headset. The audio-visual system 730 may be an embodiment of the audio-visual system 500 of FIG. 5. In some embodiments, the audio-visual system 730 captures sound from a local area surrounding the user and a visual signal depicting the local area. In some embodiments, the audio-visual system 730 provides an audio signal of a sound source in the local area and/or the visual signal to the audio-visual augmentation server 725. The audio-visual augmentation server 725 generates and sends instructions for augmenting the audio and/or visual signals to the audio-visual system 730. In other embodiments, the audio-visual system 730 processes and augments the audio and/or visual signals separate from and/or in addition to the audio-visual augmentation server 725. The audio-visual system 730 renders augmented audio-visual content for the user via the display assembly and/or the audio system.

The display assembly displays content to the user in accordance with data received from the console 715. The display assembly displays the content using one or more display elements (e.g., the display elements 420). A display element may be, e.g., an electronic display. In various embodiments, the display assembly comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 420 may also include some or all of the functionality of the optics block 735.

The audio system provides audio content to a user of the headset 705. The audio system may comprise one or acoustic sensors, one or more transducers, and an audio controller. The audio system may provide spatialized audio content to the user. In some embodiments, the audio system may request acoustic parameters from the audio-visual augmentation server 725 over the network 720. The acoustic parameters describe one or more acoustic properties (e.g., room impulse response, a reverberation time, a reverberation level, etc.) of the local area. The audio system may provide information describing at least a portion of the local area from e.g., the DCA 745 and/or location information for the headset 705 from the position sensor 740. The audio system may generate one or more sound filters using one or more of the acoustic parameters received from the audio-visual augmentation server 725, and use the sound filters to provide audio content to the user.

The optics block 735 may magnify image light received from the electronic display, corrects optical errors associated with the image light, and presents the corrected image light to one or both eyeboxes of the headset 705. In various embodiments, the optics block 735 includes one or more optical elements. Example optical elements included in the optics block 735 include: an aperture, a Fresnel lens, a convex lens, a concave lens, a filter, a reflecting surface, or any other suitable optical element that affects image light. Moreover, the optics block 735 may include combinations of different optical elements. In some embodiments, one or more of the optical elements in the optics block 735 may have one or more coatings, such as partially reflective or anti-reflective coatings.

Magnification and focusing of the image light by the optics block 735 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 410 degrees diagonal), and in some cases, all of the user's field of view. Additionally, in some embodiments, the amount of magnification may be adjusted by adding or removing optical elements.

In some embodiments, the optics block 735 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 735 corrects the distortion when it receives image light from the electronic display generated based on the content.

The position sensor 740 is an electronic device that generates data indicating a position of the headset 705. The position sensor 740 generates one or more measurement signals in response to motion of the headset 705. The position sensor 415 is an embodiment of the position sensor 740. Examples of a position sensor 740 include: one or more IMUs, one or more accelerometers, one or more gyroscopes, one or more magnetometers, another suitable type of sensor that detects motion, or some combination thereof. The position sensor 740 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 705 from the sampled data. For example, the IMU integrates the measurement signals received from the accelerometers over time to estimate a velocity vector and integrates the velocity vector over time to determine an estimated position of a reference point on the headset 705. The reference point is a point that may be used to describe the position of the headset 705. While the reference point may generally be defined as a point in space, however, in practice the reference point is defined as a point within the headset 705.

The DCA 745 generates depth information for a portion of the local area. The DCA includes one or more imaging devices and a DCA controller. The DCA 745 may also include an illuminator. Operation and structure of the DCA 745 is described above with regard to FIG. 4A.

The I/O interface 710 is a device that allows a user to send action requests and receive responses from the console 715. An action request is a request to perform a particular action. For example, an action request may be an instruction to start or end capture of image or video data, or an instruction to perform a particular action within an application. The I/O interface 710 may include one or more input devices. Example input devices include: a keyboard, a mouse, a game controller, or any other suitable device for receiving action requests and communicating the action requests to the console 715. An action request received by the I/O interface 710 is communicated to the console 715, which performs an action corresponding to the action request. In some embodiments, the I/O interface 710 includes an IMU that captures calibration data indicating an estimated position of the I/O interface 710 relative to an initial position of the I/O interface 710. In some embodiments, the I/O interface 710 may provide haptic feedback to the user in accordance with instructions received from the console 715. For example, haptic feedback is provided when an action request is received, or the console 715 communicates instructions to the I/O interface 710 causing the I/O interface 710 to generate haptic feedback when the console 715 performs an action.

The console 715 provides content to the headset 705 for processing in accordance with information received from one or more of: the DCA 745, the headset 705, and the I/O interface 710. In the example shown in FIG. 7, the console 715 includes an application store 755, a tracking module 760, and an engine 765. Some embodiments of the console 715 have different modules or components than those described in conjunction with FIG. 7. Similarly, the functions further described below may be distributed among components of the console 715 in a different manner than described in conjunction with FIG. 7. In some embodiments, the functionality discussed herein with respect to the console 715 may be implemented in the headset 705, or a remote system.

The application store 755 stores one or more applications for execution by the console 715. An application is a group of instructions, that when executed by a processor, generates content for presentation to the user. Content generated by an application may be in response to inputs received from the user via movement of the headset 705 or the I/O interface 710. Examples of applications include: gaming applications, conferencing applications, video playback applications, or other suitable applications.

The tracking module 760 tracks movements of the headset 705 or of the I/O interface 710 using information from the DCA 745, the one or more position sensors 740, or some combination thereof. For example, the tracking module 760 determines a position of a reference point of the headset 705 in a mapping of a local area based on information from the headset 705. The tracking module 760 may also determine positions of an object or virtual object. Additionally, in some embodiments, the tracking module 760 may use portions of data indicating a position of the headset 705 from the position sensor 740 as well as representations of the local area from the DCA 745 to predict a future location of the headset 705. The tracking module 760 provides the estimated or predicted future position of the headset 705 or the I/O interface 710 to the engine 765.

The engine 765 executes applications and receives position information, acceleration information, velocity information, predicted future positions, or some combination thereof, of the headset 705 from the tracking module 760. Based on the received information, the engine 765 determines content to provide to the headset 705 for presentation to the user. For example, if the received information indicates that the user has looked to the left, the engine 765 generates content for the headset 705 that mirrors the user's movement in a virtual local area or in a local area augmenting the local area with additional content. Additionally, the engine 765 performs an action within an application executing on the console 715 in response to an action request received from the I/O interface 710 and provides feedback to the user that the action was performed. The provided feedback may be visual or audible feedback via the headset 705 or haptic feedback via the I/O interface 710.

The network 720 couples the headset 705 and/or the console 715 to the audio-visual system 500. The network 720 may include any combination of local area and/or wide area networks using both wireless and/or wired communication systems. For example, the network 720 may include the Internet, as well as mobile telephone networks. In one embodiment, the network 720 uses standard communications technologies and/or protocols. Hence, the network 720 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 720 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 720 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The audio-visual augmentation server 725 augments at least one of an audio and/or visual signal corresponding to a sound source in a local area. The audio-visual augmentation server 725 may be an embodiment of the audio-visual augmentation server 200. The audio-visual augmentation server 725 may receive an audio and/or visual signal from the headset 705 and generate instructions on how to augment the audio and/or visual signal. The audio-visual augmentation server 725 provides the instructions, which in some embodiments, include the augmented audio and/or visual signals, to the headset 705. The headset 705 accordingly renders augmented audio-visual content to the user. In some embodiments, the audio-visual system 500 couples to and/or may be a component of the headset 705.

In some embodiments, the audio-visual augmentation server 725 includes mapping functionality. For example, mapping functionality may include a virtual model describing a plurality of spaces, wherein one location in the virtual model corresponds to a current configuration of a local area of the headset 705. The audio-visual augmentation server 725 receives, from the headset 705 via the network 720, information describing at least a portion of the local area and/or location information for the local area. The user may adjust privacy settings to allow or prevent the headset 705 from transmitting information to the audio-visual augmentation server 725. The audio-visual augmentation server 725 determines, based on the received information and/or location information, a location in the virtual model that is associated with the local area of the headset 705. The audio-visual augmentation server 725 determines (e.g., retrieves) one or more acoustic parameters associated with the local area, based in part on the determined location in the virtual model and any acoustic parameters associated with the determined location. The audio-visual augmentation server 725 may transmit the location of the local area and any values of acoustic parameters associated with the local area to the headset 705.

One or more components of system 700 may contain a privacy module that stores one or more privacy settings for user data elements. The user data elements describe the user or the headset 705. For example, the user data elements may describe a physical characteristic of the user, an action performed by the user, a location of the user of the headset 705, a location of the headset 705, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 700 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   identifying an audio signal of a sound source based in part on a correspondence analysis of a visual signal describing a local area that includes the sound source and sound produced by a plurality of sound sources including the sound source within the local area;
   determining an audio signal strength associated with the audio signal;
   determining a visual signal strength associated with a portion of the visual signal corresponding to the audio signal;
   selecting a weak signal from a group of signals including the audio signal and the portion of the visual signal, the selecting based in part on the visual signal strength and the audio signal strength; and
   augmenting the weak signal, wherein the augmented weak signal is presented to a user in conjunction with other signals from the group of signals.

2. The method of claim 1, further comprising:
   responsive to selecting the audio signal as the weak signal, augmenting the audio signal.

3. The method of claim 2, wherein augmenting the audio signal comprises amplifying the audio signal.

4. The method of claim 2, wherein augmenting the audio signal comprises:
   identifying frequencies in the audio signal that do not correspond to the sound source; and
   applying a filter to the audio signal to attenuate the identified frequencies.

5. The method of claim 1, further comprising:
   responsive to selecting the visual signal as the weak signal, augmenting the visual signal.

6. The method of claim 5, wherein augmenting the visual signal comprises:
   modifying one or more properties of the visual signal, wherein the one or more properties include at least one of: brightness, contrast, color, and sharpness.

7. The method of claim 5, wherein augmenting the visual signal comprises:
   augmenting a portion of the visual signal corresponding to the audio signal.

8. The method of claim 5, wherein augmenting the visual signal comprises:
   modifying the visual signal to include a visual indicator proximate to a location of the sound source.

9. The method of claim 8, wherein a movement of the visual indicator corresponds to the audio signal.

10. The method of claim 1, wherein selecting the weak signal comprises:
    receiving an input from the user indicating the weak signal; and
    selecting the weak signal based on the received input.

11. The method of claim 1, wherein selecting the weak signal comprises:
    determining a signal-to-noise ratio of the audio signal;
    determining a signal-to-noise ratio of the portion of the visual signal; and
    based on a comparison of the signal-to-noise ratio of the audio signal and the portion of the visual signal, selecting the weak signal.

12. The method of claim 1, wherein augmenting the weak signal comprises:

generating an instruction to present a haptic signal to the user in conjunction with the other signals.

13. A system comprising:
a transducer assembly configured to present audio to a user;
a display assembly configured to present visual content to the user; and
a controller configured to:
identify an audio signal of a sound source based on a correspondence analysis of a visual signal describing a local area that includes a sound source and sound produced by a plurality of sound sources including the sound source within the local area;
determine an audio signal strength associated with the audio signal;
determine a visual signal strength associated with a portion of the visual signal corresponding to the audio signal;
select a weak signal from a group of signals including the audio signal and the portion of the visual signal, the selecting based in part on the visual signal strength and the audio signal strength; and
augment the weak signal, wherein the augmented weak signal is presented to the user via at least one of the transducer assembly and the display assembly in conjunction with other signals from the group of signals.

14. The system of claim 13, wherein the controller is configured to:
select the audio signal as the weak signal; and
responsive to selecting the audio signal, augment the audio signal.

15. The system of claim 14, wherein the controller is further configured to:
amplify the audio signal.

16. The system of claim 14, wherein the controller is further configured to:
identify frequencies in the audio signal that do not correspond to the sound source; and
apply a filter to the audio signal to attenuate the identified frequencies.

17. The system of claim 13, wherein the controller is further configured to:
select the visual signal as the weak signal; and
responsive to selecting the visual signal, augment the visual signal.

18. The system of claim 17, wherein the controller is further configured to:
modify one or more properties of a portion of the visual signal that corresponds to the audio signal, the one or more properties including at least one of: brightness, contrast, color, and sharpness.

19. The system of claim 17, wherein the controller is further configured to:
modify the visual signal to include a visual indicator proximate to a location of the sound source.

20. A non-transitory computer readable medium configured to store program code instructions, when executed by a processor, cause the processor to perform steps comprising:
identifying an audio signal of a sound source based in part on a correspondence analysis of a visual signal describing a local area that includes the sound source and sound produced by a plurality of sound sources including the sound source within the local area;
determining an audio signal strength associated with the audio signal;
determining a visual signal strength associated with a portion of the visual signal corresponding to the audio signal;
selecting a weak signal from a group of signals including the audio signal and the portion of the visual signal, the selecting based in part on the visual signal strength and the audio signal strength; and
augmenting the weak signal, wherein the augmented weak signal is presented to a user in conjunction with other signals from the group of signals.

* * * * *